United States Patent
Meyers et al.

(10) Patent No.: US 7,456,513 B2
(45) Date of Patent: Nov. 25, 2008

(54) MODULAR CELL SITE WITH AIR-TURBINE BACKUP

(75) Inventors: Jerry D. Meyers, Olathe, KS (US); Julie A. Willets, Overland Park, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/140,761

(22) Filed: May 31, 2005

(65) Prior Publication Data

US 2006/0244268 A1 Nov. 2, 2006

Related U.S. Application Data

(63) Continuation-in-part of application No. 11/089,667, filed on Mar. 25, 2005, now Pat. No. 7,157,803, and a continuation-in-part of application No. 10/298,074, filed on Nov. 15, 2002, now Pat. No. 6,960,838.

(51) Int. Cl.
*F03B 13/00* (2006.01)
*H02P 9/04* (2006.01)
*C03B 19/02* (2006.01)

(52) U.S. Cl. .................................. 290/54; 62/259.2
(58) Field of Classification Search ............... 290/54; 62/259.2
See application file for complete search history.

(56) References Cited

U.S. PATENT DOCUMENTS

| | | | |
|---|---|---|---|
| 4,057,736 A * | 11/1977 | Jeppson ..................... 307/78 |
| 4,119,861 A | 10/1978 | Gocho ........................ 290/13 |
| 4,282,634 A | 8/1981 | Krauss ....................... 24/323 |
| 4,497,031 A * | 1/1985 | Froehling et al. ........... 700/276 |
| 4,598,542 A | 7/1986 | Reynolds ..................... 60/791 |
| 4,636,173 A | 1/1987 | Mossman ................... 434/178 |
| 5,265,435 A * | 11/1993 | Richardson ................. 62/133 |
| 5,355,075 A * | 10/1994 | Wilson, III ................... 322/25 |
| 5,737,202 A | 4/1998 | Shimamori .................. 363/65 |
| 5,767,637 A | 6/1998 | Lansberry ................... 318/146 |
| 5,818,336 A * | 10/1998 | Varga et al. ............. 340/545.1 |
| 5,889,659 A * | 3/1999 | Emmerich .................... 363/34 |
| 6,001,324 A | 12/1999 | Ledon et al. ................. 423/584 |
| 6,064,122 A * | 5/2000 | McConnell ................... 290/32 |

(Continued)

FOREIGN PATENT DOCUMENTS

EP 0 595 191 A1 5/1994

(Continued)

OTHER PUBLICATIONS

"A High-Availability Backup Source of Energy", J. C. Chigolet et al. dated Sep. 27, 1993.

(Continued)

*Primary Examiner*—Julio C Gonzalez
*Assistant Examiner*—Pedro J Cuevas

(57) ABSTRACT

The present invention is a DC power system incorporated into a modular housing. The primary source of power is an electrical utility. Because the electrical utility provides alternating current, the module includes a rectifier which makes the conversion to DC. The module also includes an air turbine which is used as a backup source of power. Also included is an array of lithium-metal-polymer (LMP) batteries to bridge and also for backup power if necessary.

12 Claims, 5 Drawing Sheets

U.S. PATENT DOCUMENTS

| | | | | |
|---|---|---|---|---|
| 6,066,898 | A * | 5/2000 | Jensen | 290/52 |
| 6,169,390 | B1 * | 1/2001 | Jungreis | 322/4 |
| 6,184,593 | B1 | 2/2001 | Jungreis | 307/64 |
| 6,294,842 | B1 * | 9/2001 | Skowronski | 290/7 |
| 6,323,625 | B1 * | 11/2001 | Bhargava | 322/32 |
| 6,380,637 | B1 | 4/2002 | Hsu et al. | 290/1 R |
| 6,452,289 | B1 | 9/2002 | Lansberry et al. | 307/25 |
| 6,498,462 | B2 | 12/2002 | Ballantine et al. | 322/8 |
| 6,522,955 | B1 | 2/2003 | Colborn | 700/286 |
| 6,605,928 | B2 * | 8/2003 | Gupta et al. | 322/10 |
| 6,649,289 | B2 | 11/2003 | Hsu et al. | 429/13 |
| 6,666,027 | B1 * | 12/2003 | Cardenas, Jr. | 60/772 |
| 6,670,721 | B2 | 12/2003 | Lof et al. | 290/44 |
| 6,703,722 | B2 | 3/2004 | Christensen | 307/71 |
| 6,844,706 | B2 * | 1/2005 | Pinkerton et al. | 322/29 |
| 6,879,052 | B1 * | 4/2005 | Johnson | 290/1 A |
| 6,885,112 | B2 * | 4/2005 | Johnson | 290/1 A |
| 6,891,282 | B2 * | 5/2005 | Gupta et al. | 290/52 |
| 6,909,199 | B2 * | 6/2005 | Gupta et al. | 290/52 |
| 6,911,742 | B2 * | 6/2005 | Gupta et al. | 290/52 |
| 6,930,402 | B1 * | 8/2005 | Johnson et al. | 290/1 R |
| 6,956,301 | B2 * | 10/2005 | Gupta et al. | 290/52 |
| 6,960,838 | B2 * | 11/2005 | Johnson | 290/1 A |
| 6,988,026 | B2 * | 1/2006 | Breed et al. | 701/29 |
| 6,989,610 | B2 * | 1/2006 | Gupta et al. | 290/52 |
| 6,998,728 | B2 * | 2/2006 | Gupta et al. | 290/52 |
| 7,045,913 | B2 * | 5/2006 | Ebrahim et al. | 290/52 |
| 7,081,687 | B2 * | 7/2006 | Johnson | 290/1 A |
| 7,127,895 | B2 * | 10/2006 | Pinkerton et al. | 60/646 |
| 7,157,803 | B2 * | 1/2007 | Meyers et al. | 290/1 A |
| 7,230,344 | B2 * | 6/2007 | Pollack et al. | 290/40 C |
| 7,358,620 | B2 * | 4/2008 | Melfi | 290/1 A |
| 7,400,052 | B1 * | 7/2008 | Badger | 290/1 A |
| 2001/0009338 | A1 | 7/2001 | Reutere | 307/68 |
| 2003/0189339 | A1 * | 10/2003 | Gupta et al. | 290/52 |
| 2004/0094963 | A1 * | 5/2004 | Johnson | 290/2 |
| 2004/0095022 | A1 * | 5/2004 | Johnson | 307/64 |
| 2004/0148934 | A1 * | 8/2004 | Pinkerton et al. | 60/646 |
| 2005/0073152 | A1 * | 4/2005 | Gupta et al. | 290/52 |
| 2005/0275224 | A1 * | 12/2005 | Potter et al. | 290/43 |
| 2006/0059936 | A1 * | 3/2006 | Radke et al. | 62/259.2 |
| 2006/0059937 | A1 * | 3/2006 | Perkins et al. | 62/259.2 |
| 2006/0076831 | A1 * | 4/2006 | Meyers et al. | 307/10.1 |
| 2007/0022755 | A1 * | 2/2007 | Pinkerton et al. | 60/646 |

FOREIGN PATENT DOCUMENTS

| WO | WO 99/32762 | 7/1999 |
|---|---|---|

OTHER PUBLICATIONS

Yutaka, Kuwata, "Multifuel Fuel-Cell Energy System for Telecommunications Cogeneration System," Ieice Trans. Commun.. vol. E1 B.. No. 11, Nov. 1998.

"Advances promise high cycle life, commercial viability for electric vehicles," Dept. of Energy, U.S.A., Apr. 2001.

Web page from www.activepower.com regarding TACAS Basic Clean Source® XR: Thermal and Compressed-Air Storage, May 12, 2005.

Press Release from Active Power regarding Active Power Ships First CleanSource® XR Unit, Dec. 16, 2004.

* cited by examiner

MODULAR CELL SITE WITH AIR-TURBINE BACKUP

CROSS-REFERENCE TO RELATED APPLICATIONS

This application is a continuation-in-part of and claims the benefit, under 35 U.S.C. 120, of prior nonprovisional application Ser. No. 11/089,667, filed Mar. 25, 2005, now U.S. Pat. No. 7,157,803 and of prior nonprovisional application Ser. No. 10/298,074, filed Nov. 15, 2002 now U.S. Pat. No. 6,960,838.

STATEMENT REGARDING FEDERALLY SPONSORED RESEARCH OR DEVELOPMENT

None.

FIELD OF THE INVENTION

In general, this invention relates to the field of providing base-transceiver station (BTS) and power equipment for use with a cell tower. More specifically, this invention relates to power-system-housing arrangements, installations, and power-backup systems.

BACKGROUND OF THE INVENTION

Traditionally, cell sites are constructed using commercial power from a utility as the primary source of electrical power. Telecommunications power systems include backup power arrangements to ensure continued power in the event blackouts and other disturbances in the commercial power grid. To accomplish this, many facilities use a diesel generator. The diesel generator is then backed up by an array of valve-regulated lead-acid (VRLA) batteries. The combined arrangement—the AC electrical utility receiving equipment, diesel generator, and VRLA batteries—are all separately installed at a site. This takes up a considerable amount of space.

These conventional systems can be time consuming to install as each component must be engineered and installed separately. This is because each site has its own restrictions so the layout generally has to be tailored to the individual site, driving up engineering and installation costs.

Further, when a site's BTS and power requirements increase over time, the engineering decisions become complex. For example, the engineer must decide whether to augment or replace the existing equipment. Finding equipment to complement the existing equipment is difficult due to space limitations and lease agreements with the land owners.

SUMMARY OF THE INVENTION

The present invention is a system for providing electrical power. The system includes a conversion device. The conversion device is used to convert a utility alternating current (AC) source into a first possible source of direct current (DC). The system also includes an energy-storage device for providing a second possible source of DC. Finally, the system includes a generating device. The generating device is adapted to receive a substance under pressure to create mechanical energy. This mechanical energy is then used to create a third possible source of DC.

BRIEF DESCRIPTION OF THE DRAWINGS

The present invention is described in detail below with reference to the attached drawing figures, wherein.

DETAILED DESCRIPTION OF THE INVENTION

The present invention has numerous advantages over the conventional power-system housing arrangements, system installations, backup arrangements.

For example, the disclosed embodiment takes up much less space. One module of the present invention takes up only about a 3' by 11' pad (33 ft$^2$), whereas a comparable conventional BTS/VRLA arrangement would require a floor area of about 12' by 18' (or 216 ft$^2$)—six times the space. If a generator is installed at the site, even more space would be required.

Also a consideration is the modular aspect of the present invention. Unlike conventional systems which are engineered for the specific requirements of a new site, or re-engineered to meet increased BTS and power requirements in expanding a site, the new modular system comes to the site ready for use. Each module comes already assembled. When additional BTS and power requirements are necessary at a new or expanding site, a module is transported to, and then incorporated into the already-existing systems at the facility. Once hooked up, it is ready for service.

Figure 1:
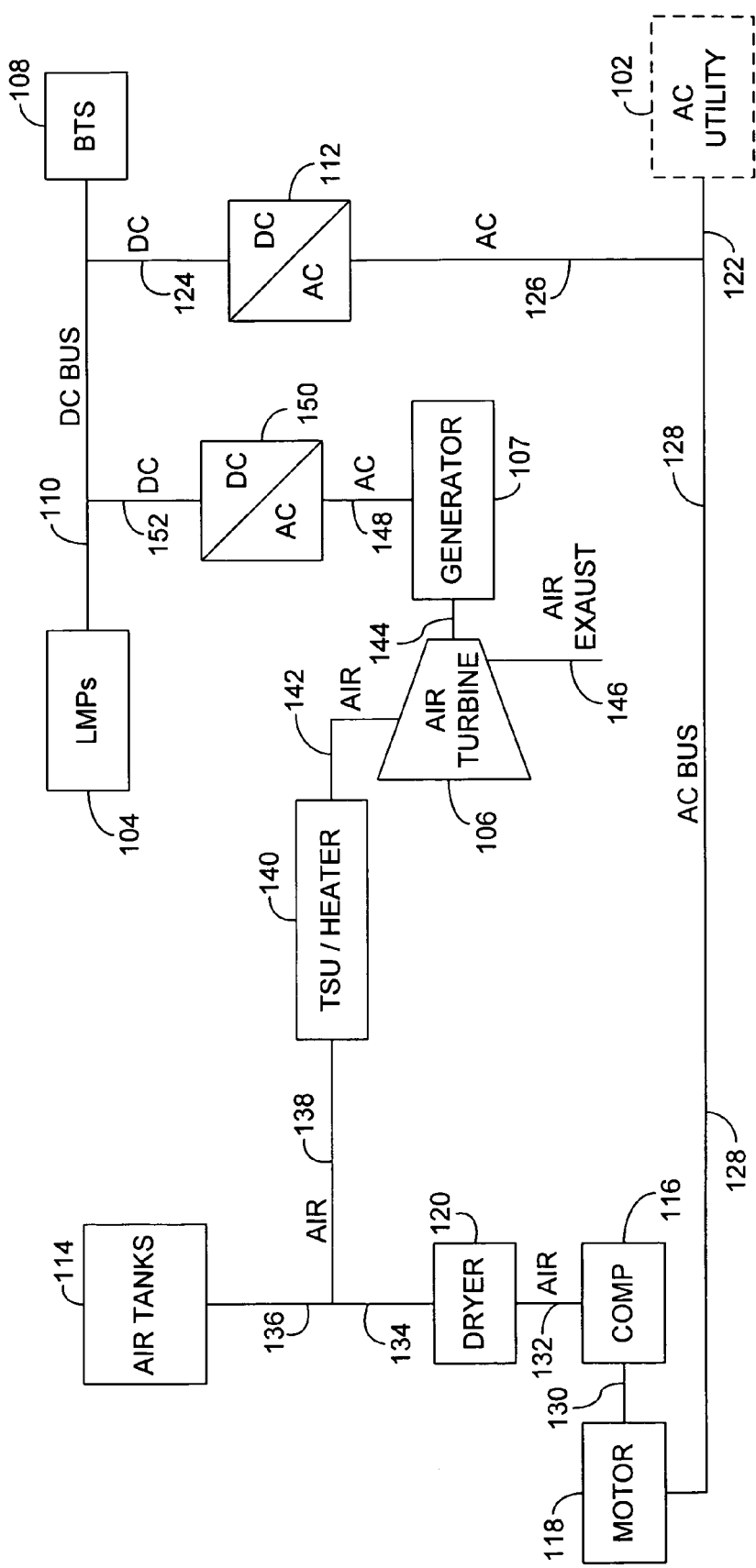
FIG. 1 is a schematic showing how the components of the present invention are functionally interconnected and thus operate together.

The drawings of FIGS. 1-5 help in understanding the disclosed embodiment. Referring first to FIG. 1, the figure shows a novel power system in which the present invention, in one embodiment, may be employed.

Looking first to FIG. 1, we see a schematic representation 100 of the system components. Each module is adapted to consume AC from a utility AC source 102. The system also includes a DC power storage device 104. In the preferred embodiment, storage device 104 is a lithium battery. The system also includes an air turbine 106 with a generator 107.

All three of potential energy sources 102, 104, and 107 are used to ensure that DC power is maintained to the BTS 108. The BTS is the radio-hardware portion of a cellular base station. It is involved in the transmission and receiving of voice and data. Power distribution units comprise the electrical equipment for making the necessary connections into the telecommunication-cell-site equipment. In the present embodiment, the BTS equipment is housed in a cabinet.

It should be understood that it is very important that power is not lost to the BTS—even temporarily. Failures could irrevocably damage customer relations. Customers are becoming increasingly dependent on telecommunications systems to handle important matters, e.g., financial transactions. The system and processes here dramatically reduce the possibilities for failure.

This objective is accomplished by providing a backup system for BTS 108 in case the utility AC source 102 goes down.

For example, the system must be prepared to successfully encounter blackouts, rolling power losses, and other possible problems with utility source 102.

BTS 108 consumes DC, not AC. Thus, the AC received from source 102 must be converted. To do this, system 100 includes at least one conversion device 112. In the preferred embodiment, conversion device 112 comprises a plurality of rectifiers. Rectifiers 112 convert AC to DC. The particular rectifiers used in the present invention are switch-mode rectifiers (SMRs). SMRs are advantageous for use here because they are highly efficient, have small size, and are relatively light weight.

The DC output from rectifiers 112 is connected into a DC bus 110. The DC input to BTS 108 is also included on this bus. Thus, BTS 108 is able to receive its primary source of power from AC utility 102.

If the AC goes out, the energy-storage devices 104 will immediately pick up the load temporarily in a bridging capacity. In the preferred embodiment, these energy-storage devices 104 are lithium batteries. More specifically, lithium-metal-polymer batteries ("LMPs"). The LMPs have an anode made of lithium and an organic electrolyte with no water. Though LMPs have been used in the preferred embodiment, other energy storage devices, and other kinds of lithium-batteries might be used as well and still fall within the scope of the present invention. Lithium-ion batteries are comprised of a carbon anode, a metal oxide cathode, and an electrolyte which is a lithium salt in an organic solvent. Other kinds of batteries, e.g., nickel-cadmium might work as well and would also fall within the scope of some embodiments of the present invention.

LMP batteries provide several key advantages over other battery architectures such as valve-regulated lead-acid (VRLA), gell cells, and other known battery sources, in that they operate in high or low ambient temperatures (−40° F. to +149° F.) without the need for external heating or cooling requirements. A battery capable of withstanding extreme temperatures is advantageous for a communications provider in industrial applications. One reason for this is that in most wireless telecommunication networks, a base transceiver station (BTS) is located at or near an outdoor communications tower. Because of this, it is important that the modular unit be able to endure a wide range of weather and temperature changes.

Further, LMP batteries may be used by a provider in an enclosure having no air-conditioning. They are also smaller than conventional batteries. These factors result in saved space and costs.

Another advantage of using LMP batteries within a communications network is that they are environmentally friendly and noncorrosive. This allows a provider to house the batteries in cabinets or other enclosures without venting. Venting is unnecessary because the LMP batteries do not emit gases (hydrogen and other toxins) that are harmful to breathe or are flammable.

Another benefit of LMP batteries is that they exhibit a long life span (greater than 10 years) and a slow-linear aging characteristic. This provides the communication provider with greater reliability, and enables them to accurately predict battery replacement intervals.

Additionally, LMP batteries may be disconnected and put into sleep mode. Sleep mode is a state in which the LMP is temporarily taken off line until it is later called back into duty. This avoids drain which would otherwise require periodic recharging.

Another distinct advantage of the LMP battery is the ability to locally or remotely monitor the battery status either from an LED source located on the battery, or via a link-cable connected to the provider's computer, communications network, or alarm system. Determining when a battery is nonfunctional is a time-saving tool for providers and technicians performing preventive maintenance measures. A visible LED source located on the battery provides an easily viewed indication of the batteries state of health. Furthermore, in the preferred embodiment, these batteries are smart devices, which enable them to notify a systems administrator over a computer network of failures.

The LMP battery used in the preferred embodiment of the invention is a 48-volt, 63 amp-hour battery manufactured by Avestor, Inc. (Model No. SE 48S63), but the scope of the invention is not to be limited to any particular manufacturer or amp-hour/voltage level used. Three batteries are used in the present embodiment (see FIG. 3).

With respect to its bridging functions, the LMP batteries 104 provide electrical power during the time it takes to switch from the AC utility 102 as a source to the air turbine 106. In order to accomplish this, each LMP battery 104 is electrically linked to bus 110 in parallel with the air turbine 106 output and the rectifier-array output. Bus 110 then makes the electrical connection into the power distribution equipment in BTS 108.

Figure 4:
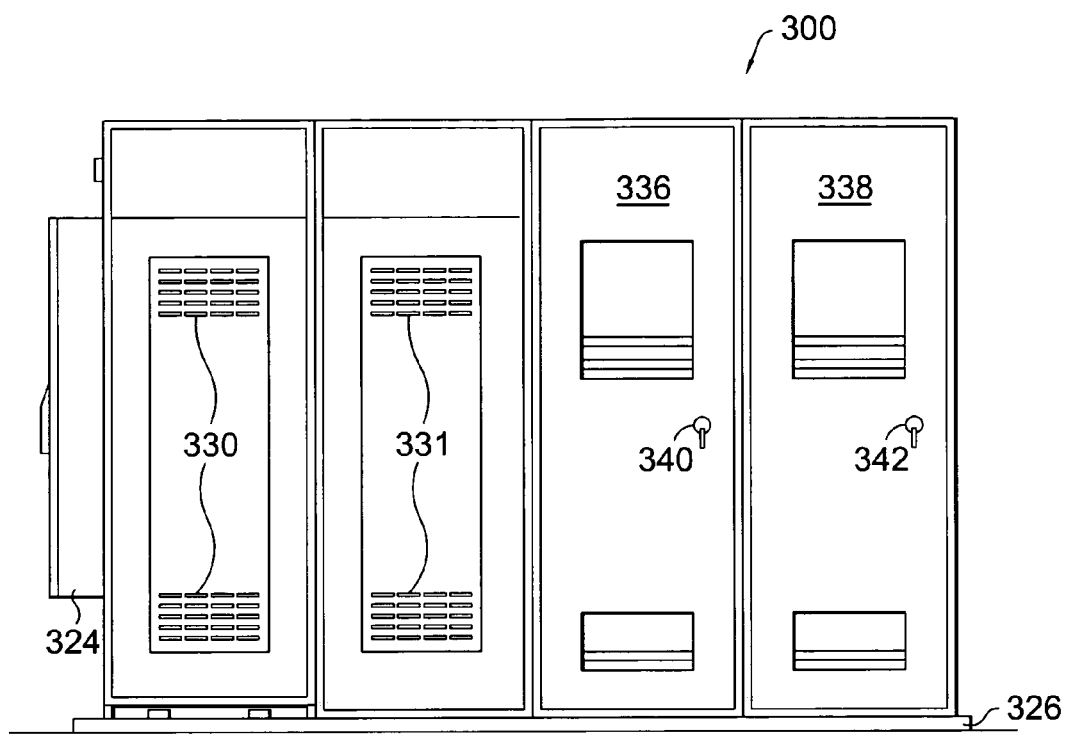
FIG. 4 is back view of the housing of the present invention.
Figure 5:
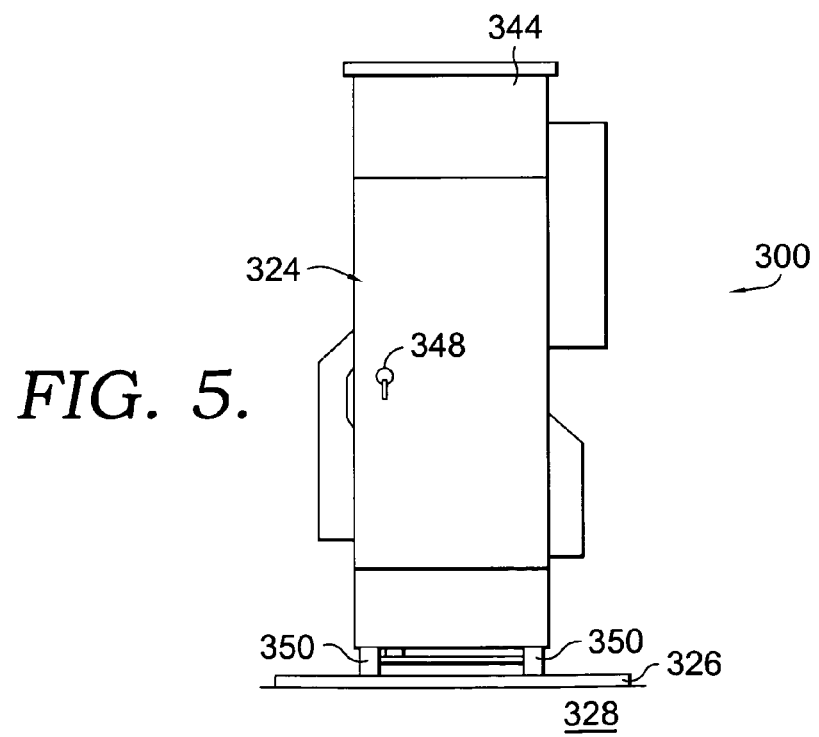
FIG. 5 is a side-view of the housing of the present invention.
Figure 6:
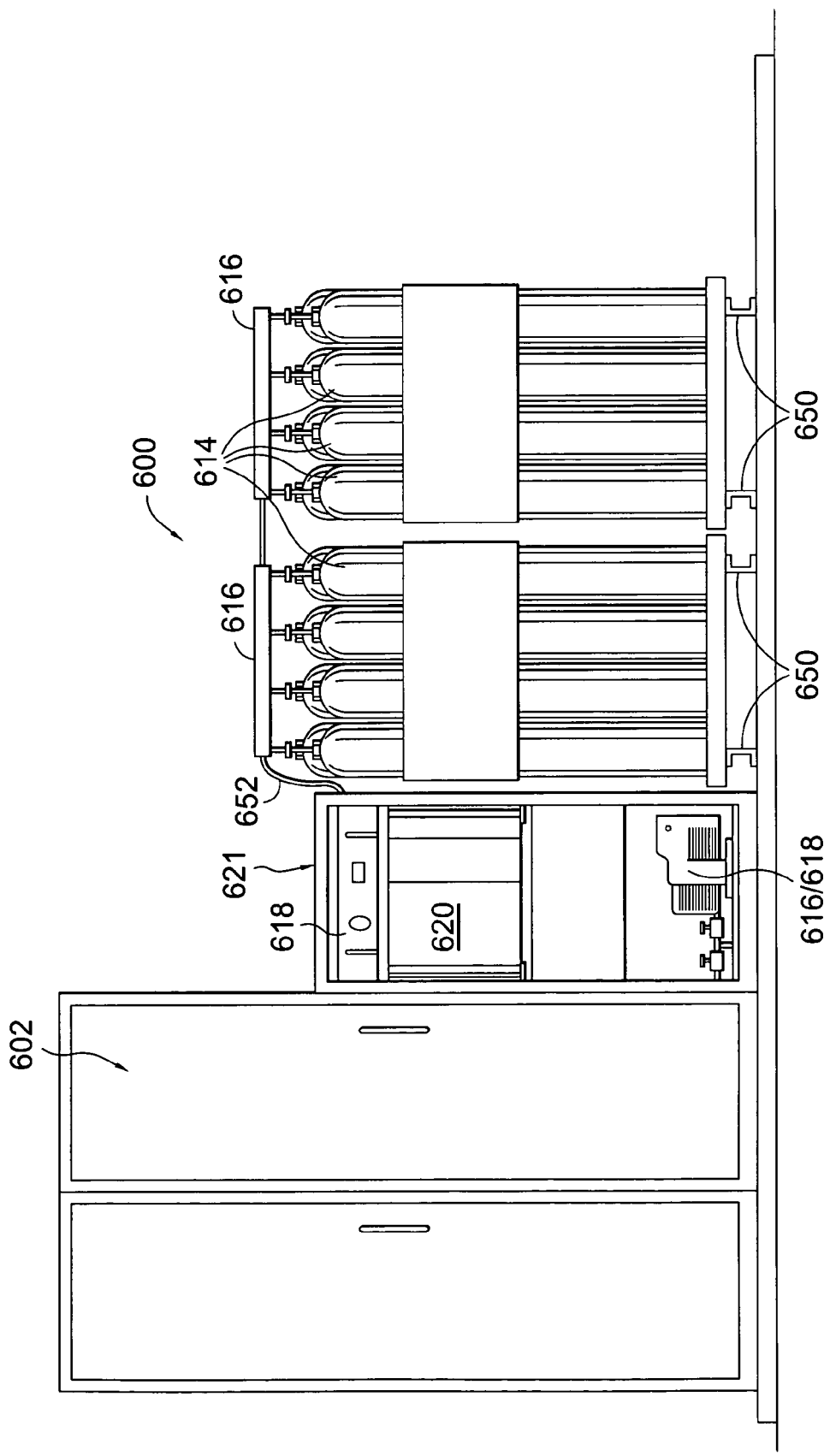
FIG. 6 is a front view of an alternative embodiment of the present invention.

In the preferred embodiment disclosed in FIGS. 1-5, as well as a second embodiment 600 disclosed in FIG. 6, the turbine is an air turbine.

In the FIG. 1 arrangement, pressurized air is maintained in air tanks 114. Twelve tanks exist in the disclosed embodiments. See FIGS. 3 and 6. But the number is not critical. The flow of air into and out of tanks 114 is controlled using automated valves (not shown), one at the top of each tank. The pressure in tanks 114 is maintained using an electric motor 118, a compressor 116, and a dryer 120. When utility AC source 102 is available, motor 118 is powered by drawing AC current from an AC bus 128. The motor 118 rotates a shaft 130 which drives compressor 116. Compressor 116 then accepts air from the surroundings and compresses it. The air accepted will include water. When the air is compressed, this water will condensate out. Dryer 120 exists to remove this condensed water from the air so that a resulting output 134 of dried air is introduced into tanks 114.

Motor 118 will drive compressor 116 until some predetermined maximum pressure is reached in tanks 114. Pressure sensors (not shown) exist in the header (See FIGS. 3 and 6) of the tanks which monitor the pressure in the tanks. Once this pressure is reached (and thus, the tanks have been pressurized to a desired level) motor 118 and compressor 116 will shut off.

Thereafter, assuming AC power is available from utility 102, the motor 118 will be turned on and off to repeatedly replenish the pressure in the tanks when necessary. The motor will be activated whenever the pressure sensors in the header detect that the pressure in the tanks has dropped below a predetermined minimum temperature.

If it becomes necessary to operate the system on air power (e.g., when AC utility 102 is not available for some reason) the stored air is released from tanks 114, and it travels via line 136 into a common duct 138.

A thermal storage unit (TSU) 140 with an associated heater (not shown) is provided in line 138. This unit is essentially an externally insulated block of solid stainless steel which includes a winding air passageway. In one embodiment, the block is electrically heated using a heating coil which draws AC from the AC utility 102 (this arrangement is not shown). In another embodiment, a propane gas heater is provided for the same purpose. The propane arrangement might be advantageous for situations in which the AC utility 102 becomes unavailable because a propane heat source is not AC dependent. Regardless, however, the TSU will store heat for a considerable amount of time.

When the pressurized air passes through the air passageways through the TSU, it is heated considerably. This causes the air to expand dramatically, accelerates it, and gives it more energy before it passes into turbine 106.

Devices which incorporate pressurized air tanks with thermal storage energy units (like TSU 140) and air turbines (like turbine 106) together in combination to produce energy are known, and are commercially available from Active Power, Inc. which is located in Austin, Tex.

Turbine 106 includes a radial array of airfoils (not shown) which receive the flow of air and then turn a shaft 144 to create mechanical energy. After transferring energy to, and passing beyond the turbine array, the air is released to the atmosphere via an air exhaust 146.

Rotating shaft 144 is used to drive an AC generator 107. This results in an AC output 148. Because BTS 108 consumes DC, at least one second conversion device, which in the preferred embodiment is at least one rectifier 150 (more specifically, at least one SMR) is provided to convert AC output 148 into a DC source 152 which is fed into DC bus 110. Once introduced into bus 110, this turbine-generated DC source will be available to BTS 108.

If the air turbine 106 fails mechanically, or the stored pressurized tanks run out, the energy-storage devices (LMPs) 104 are then used as a backup power source. Thus, they must be selected to have sufficient amp-hour ratings to meet backup requirements.

Though not shown, the power system of the present invention also comprises a control system which includes a number of sensing and control mechanisms (not shown). As will be known to one skilled in the art, these kinds of automated systems may be separate devices, or may be integral to valves, bus lines, and/or devices being monitored. Likewise, the control mechanisms may be separate devices, such as programmable logic controllers, or may be integrated into the components already described. Regardless, this kind of monitoring and activating equipment will be arranged to, i.e., (i) detect when a power drop exists in utility AC source 102, open the automated valves on the tanks 114 to release the pressurized air, and open valve 117 to drive the turbine; (ii) detect when the predetermined maximum pressure has been reached in the tanks 114 and shut off the compressor 116; and (iii) detect when the predetermined minimum has been reached in the tanks 114 and then start the compressor 116. Particular arrangements for accomplishing these control-system objectives will be evident to and fall within the abilities of one skilled in the art.

Figure 2:
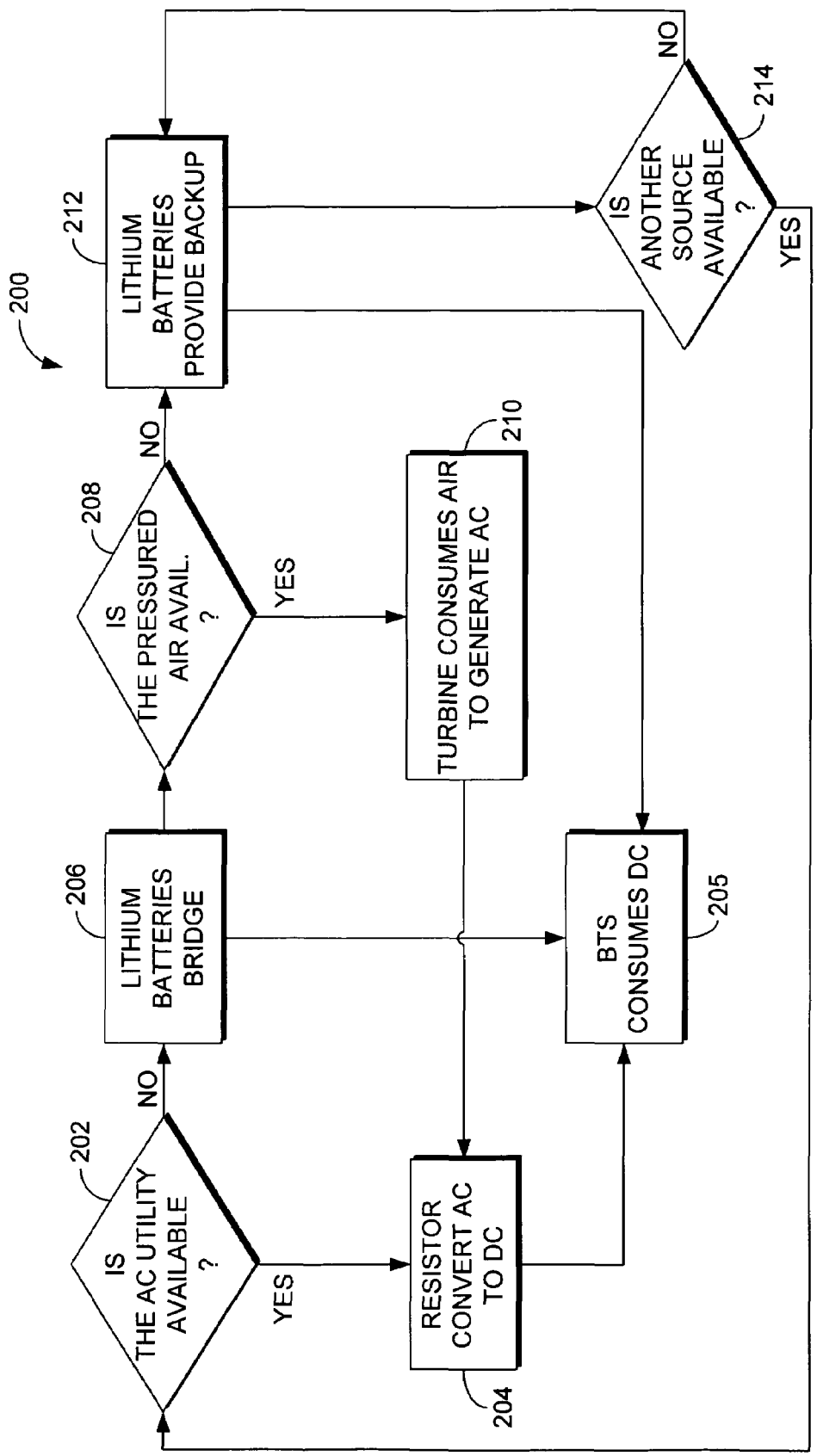
FIG. 2 is a flow chart showing the backup processes of the present invention.

A power-management flow chart 200 of FIG. 2 shows both the operational aspects of system 100 as well as different contingency plans in the event that the AC utility 102 fails. In a first step 202 of the process, an inquiry is made as to whether AC utility 102 is available as the primary energy source. The typical answer to this question will be yes. One way this may be determined is by monitoring AC bus 128 for current. Normally, current will be detected and the process will move on to a step 204.

In step 204, at least one conversion device, e.g., SMRs 112, will convert the AC current from utility 102 into DC current. This DC current is introduced into bus 110 via line 124 for consumption by BTS 108 in a step 205. This is the normal mode of operation for the overall power system.

If, however, AC current is not available from utility 102 because, e.g., the power grid is down, no current will be detected in bus 128. When this happens, the "no" prong for the query in step 202 directs the process to a step 206. In step 206, the lithium batteries 104 will temporarily bridge so that constant power is maintained to the BTS until the air turbine 106 comes on line. Usually only a few hundred milliseconds from when the AC utility goes down to the time turbine 106 begins to drive generator 107 to back up the system with generated AC. The lithium batteries are adapted to meet this down-time requirement and provide DC for the consumption of the BTS in step 205.

A step 208 is a query of whether pressurized air is available to turbine 106. If pressurized air is available, the automated valves on the tanks as well as valve 117 will open up, and air turbine 106 will begin to drive generator 107 to produce AC power in a step 210. When this occurs, the process moves back to step 204 and the AC output of the turbine generator is converted to DC using at least one rectifier 150 so that it may be consumed by the BTS 108 in step 205.

The air turbine will continue to generate electrical output in step 210 until (i) the pressurized air runs out or (ii) AC utility 102 is restored. If AC utility 102 is restored at any time, the control system will automatically switch back to it as the primary source.

But if AC utility 102 is not restored, and if the pressurized air in tanks 114 runs out (or if there is some kind of mechanical failure of the turbine), the process will move from inquiry step 208 on to a step 212 in which the lithium batteries provide backup power. While the batteries are being drained to provide backup power to BTS 108 via bus 110, the control system will continually check to see if another source (AC utility 102 or air turbine 106) has come back on line. If so, the system loops back to step 202 which will result in repeating the same process. If not, the process loops back to step 212 and BTS 102 continues to be powered by the lithium batteries.

Through these processes, the air turbine backup arrangement is able to outperform the conventional systems in terms of reliability, efficiency, and in eliminating space constraints.

Figure 3:
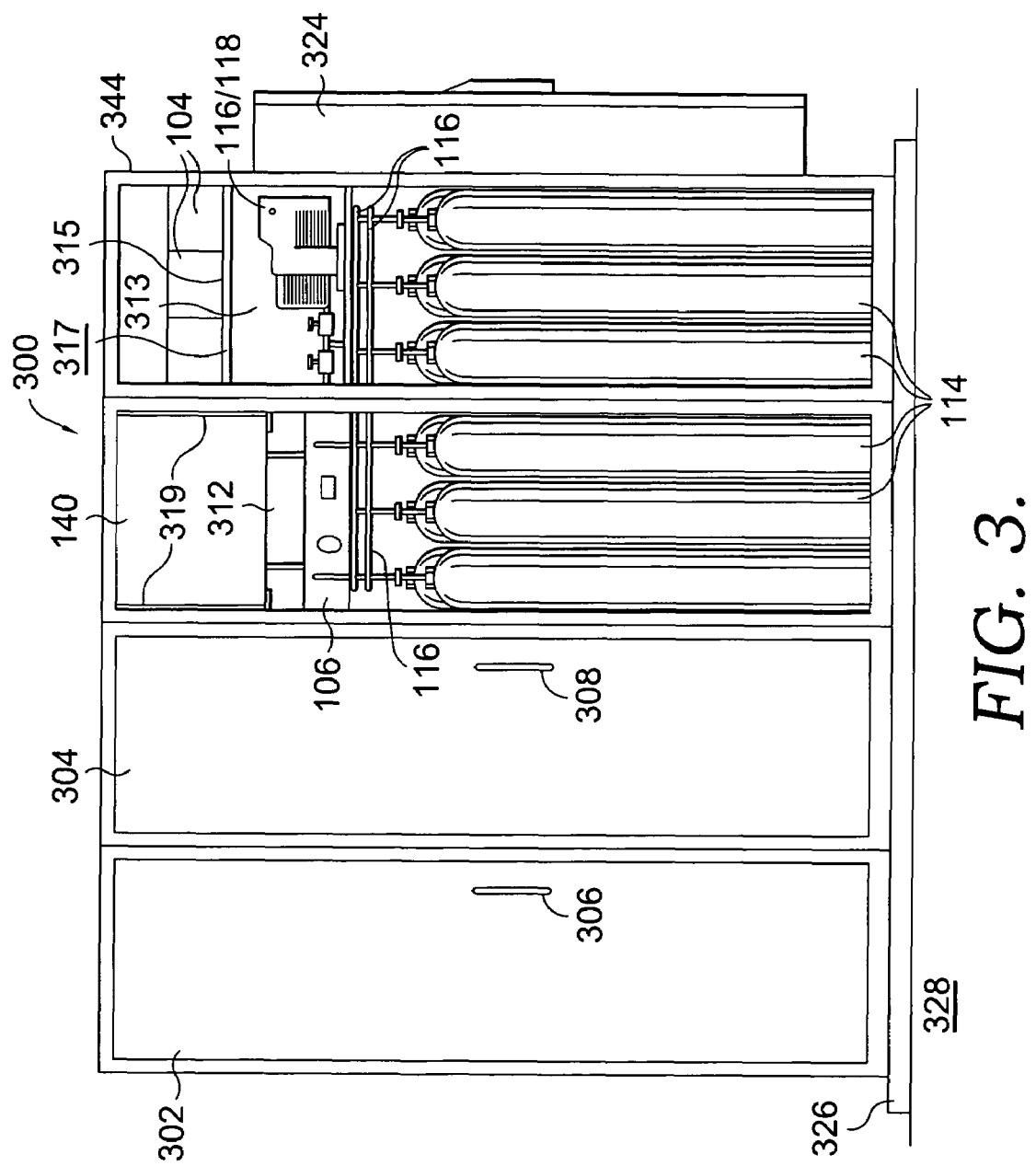
FIG. 3 is a front view of the physical embodiment of the housing of the invention shown including some of the equipment utilized.

Referring now to FIGS. 3-5, we see a physical embodiment of the present invention. FIG. 3 is a front view of a housing 300 which is used to house the BTS components as well as the supporting power-system equipment. The BTS equipment is housed in an enclosure (not shown) accessible through a pair of cabinet doors 302 and 304. Each of cabinet doors 302 and 304 has handles, 306 and 308, respectively. Doors 302 and 304 make the BTS equipment accessible from the front side of the cabinet.

To the right of the BTS equipment compartments, six of the pressurized air tanks 114 are stored in a compartment 312 and another six in another compartment 313. In the preferred embodiment, a total of twelve tanks 114 are used, but it is important to note that the number of tanks is not critical. As can be seen, all of the tanks 114 are connected into a manifold 116 which runs through both compartments and enables the pressure in all the tanks to be equalized.

TSU 140 is fixed using a pair of brackets 319 which are installed into the upper portion of compartment 312. Immediately below, air turbine 106 is fixed in the cabinet. The turbine receives pressurized air from manifold 116 via a tube.

The LMPs 104 are located on a shelf 317 in the upper part of chamber 313. Immediately below the lithium batteries 104 is the motor 116/compressor 118 arrangement. At the far right end of the housing is a power protection cabinet (PPC) 324. PPC 324 includes surge-protection equipment (not shown) and other electrical components (circuit breakers, relays, etc.) which are all used for connectivity into the AC utility 102. The entire housing is supported on a concrete pad 326 which rests on a grade 328.

Looking now to FIG. 4, the back of cabinet 300 has vents 330 and 331. These vents 330 and 331 help dissipate heat. Immediately right of vents 330 and 331, two doors 336 and 338 have handles 340 and 342 respectively. These doors give rear access to the BTS equipment from the back side of the cabinet. You will recall that the front of the cabinet has doors 302 and 304. Access to the BTS equipment from both sides is desirable because, as one skilled in the art will recognize, features exist on both sides of the equipment.

FIG. 5 shows the right-hand side of the cabinet which includes PPC 324 which is attached to a right wall 344 of the housing. PPC 324 has a door 346 with a latched handle 348 for access. Another thing which can be seen in FIG. 5 is that the pressurized air portion of the housing is elevated on a plurality of feet 350.

FIG. 6 shows an alternative embodiment 600 of the present invention in which two groups of pressurized air tanks 614 are located outside a cabinet 602. Thus, the tanks may be easily accessed. Like the earlier embodiment, a manifold 616 is used which is linked via air tube 652 to an air turbine 618 located at the top of a small cabinet-like housing 621. In this embodiment, TSU 620 is located immediately below the turbine 618 in cabinet 621. Below that is a motor/compressor assembly 616/618. To the left of that, the BTS equipment is contained in a cabinet 602.

The modular aspect of both embodiments (300 or 600) makes them easily installed. They come equipped such that it need only be placed near an erected tower, and they are ready to go. The concrete pad is preinstalled at the desired spot at the sight, the entire module transported in one piece to the site, placed on the pad, and connected into the an existing AC source connecting the BTS to the tower and also into at least one communications line, e.g., a T-1 line. Then it is ready to go.

One or more modules will be delivered to a particular site along with BTS equipment 108 (not shown in FIGS. 3-5), air turbine 618, LMP batteries 104, electrical equipment, air tanks 114, and all the other supporting equipment already preassembled in the cabinet ready for use so that it is available to a new site upon delivery.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A modular system that provides backup electrical power to telecommunications equipment via a pressurized air driven turbine operating in cooperation with a generator that are initiated by a control system, wherein the electrical power is presented at a voltage level appropriate for the telecommunications equipment, said system comprising:
   a first conversion device for converting alternating current (AC) from an AC utility into a primary source of direct current (DC) fed into a DC bus;
   the turbine operable to utilize the pressurized air to create mechanical energy;
   the generator for converting the mechanical energy created by the turbine to AC;
   a second conversion device for converting AC from the generator into DC that is introduced to the DC bus when a power drop exists in the utility AC;
   an energy-storage device for automatically introducing DC to the DC bus as a bridge during a switch between the AC utility to the turbine;
   the DC bus that is electrically linked to the first conversion device, the second conversion device, and the energy-storage device in parallel, and conveys DC to the BTS equipment; and
   a housing in which the first conversion device, the energy-storage device, the turbine and the generator are located, wherein the housing encloses the BTS equipment within an internal cabinet, and where the BTS equipment supports communication from a communications tower.

2. The system of claim 1 comprising:
   a compressor for compressing air to form said pressurized air.

3. The system of claim 2 comprising:
   at least one tank for maintaining said pressurized air, wherein the at least one tank is coupled to the compressor via automated valves.

4. The modular system of claim 3, further comprising an AC bus connecting the AC utility to a motor for driving the compressor until a predefined maximum pressure is reached in the at least one tank, wherein the AC bus interconnects the AC utility, the motor, and the second conversion device.

5. The modular system of claim 4 comprising:
   the control system adapted to switch from the AC utility to DC derived from said electrical power output of the generator when the AC utility is unavailable, wherein switching comprises:
   (a) detecting a power drop in the utility AC:
   (b) opening the automated valves at the top of the at least one tank for releasing the pressurized air to the turbine
   (c) detecting a predetermined minimum pressure is reached in the at least one air tank:
   (d) starting the motor to drive the compressor until the predefined maximum pressure is reached in the at least one tank.

6. The modular system of claim 1, wherein the energy-storage device is a non-corrosive, linear-aging LMP battery that operates between the ambient temperatures of −40 degrees Fahrenheit and +149 degree Fahrenheit.

7. The modular system of claim 6, wherein the energy-storage device is further configured for entering a sleep mode state when disconnected from the DC bus, thereby avoiding drainage.

8. The system of claim 1 wherein said housing includes a plurality of chambers, each chamber adapted to receive at least one particular device.

9. The modular system of claim 1 wherein said housing also includes a power-protection compartment including power-protection equipment that includes surge-protection equipment connected to the AC utility.

10. The system of claim 1 comprising:
    a heating device for raising the temperature of said pressurized air before it is introduced into said turbine.

11. The modular system of claim 1, wherein the BTS equipment comprises radio hardware that transmits and receives voice and data.

12. The modular system of claim 1, wherein the housing is assembled with the BTS equipment therein such that the system is transportable to the communications tower as a single module unit.

* * * * *